(12) United States Patent
Reynolds

(10) Patent No.: US 6,485,181 B2
(45) Date of Patent: Nov. 26, 2002

(54) THRUST BEARING ASSEMBLY

(75) Inventor: Warren C. Reynolds, Orange, CA (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 09/764,474

(22) Filed: Jan. 17, 2001

(65) Prior Publication Data

US 2002/0094144 A1 Jul. 18, 2002

(51) Int. Cl.[7] ............................................... F16C 17/04
(52) U.S. Cl. ...................................................... 384/304
(58) Field of Search ................................. 384/304, 121, 384/107, 302, 303

(56) References Cited

U.S. PATENT DOCUMENTS

| | | |
|---|---|---|
| 3,384,428 A | 5/1968 | Hodge |
| 3,602,558 A | 8/1971 | Reynolds |
| 3,716,244 A | 2/1973 | Hellwig |
| 3,748,001 A | 7/1973 | Neumann et al. |
| 3,986,752 A | 10/1976 | Bogar et al. |
| 4,030,787 A | 6/1977 | Brogan et al. |
| 4,033,647 A | 7/1977 | Beavers |
| 4,553,858 A | 11/1985 | Neugebauer et al. |
| 4,554,983 A | 11/1985 | Obrecht |
| 4,596,475 A | 6/1986 | Pannwitz |
| 4,872,768 A | 10/1989 | Brandenstein et al. |
| 5,169,245 A | 12/1992 | Harada et al. |
| 5,531,526 A | 7/1996 | Labedan et al. |
| 5,564,836 A | * 10/1996 | Ide et al. ..................... 384/122 |
| 5,584,585 A | 12/1996 | Premiski et al. |
| 5,611,628 A | 3/1997 | Brovwer |

* cited by examiner

Primary Examiner—Lenard A. Footland
(74) Attorney, Agent, or Firm—Franklin L. Gubernick

(57) ABSTRACT

Disclosed is a self-lubricating thrust bearing having a number of axially-aligned parts. The bearing is preferably in cartridge form and includes an internal circular spring. The spring is located between two adjacent disks and functions to force the disks apart when the bearing loading is below a predetermined amount. In this manner, when the bearing loading is low, the spring applies pressure to the bearing's components and any attached structure. When the bearing loading exceeds a predetermined amount, the spring becomes compressed sufficiently to enable direct contact between the disks while not interfering with the rotational movement of any part of the bearing.

24 Claims, 6 Drawing Sheets

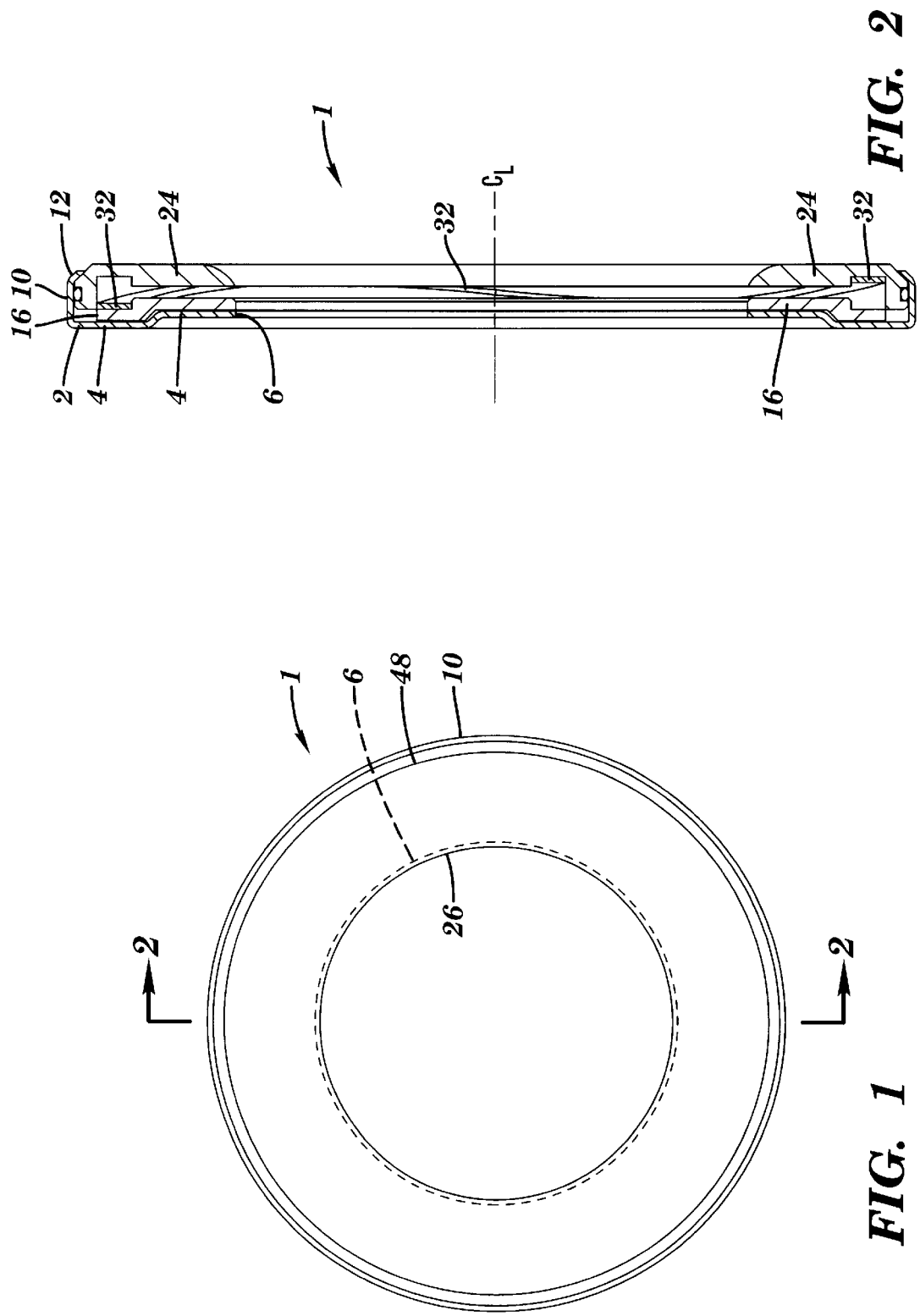

THRUST BEARING ASSEMBLY

FIELD OF THE INVENTION

The invention is in the field of bearings. More particularly, the invention is a self-lubricating thrust bearing having a plurality of axially-aligned parts. The bearing is preferably in cartridge form and includes an internal circular spring. When the bearing loading is low, the spring expands and urges the bearing's mating surfaces together, while also causing a positive contact between the bearing and the structure to which it is secured. Once the bearing loading exceeds a predetermined amount, the spring's location and extent of compression prevent it from interfering with the rotational movement of any portion of the bearing.

BACKGROUND OF THE INVENTION

Bearings are often employed in structures that are subject to variable loading. In some situations, the loading of the bearing will range from zero to an extreme amount. Throughout the entire load range, the bearing must maintain its structural integrity and preferably also maintain positive contact with adjacent structure. In addition, the amount of load acting on the bearing, in combination with the bearing's design, can affect the performance characteristics of the structure in which the bearing is installed.

One example of a structure having a bearing subject to extreme variations in loading is found in the nose landing gear of an airplane. The nose landing gear, also herein referred to as the nose gear, includes the plane's front wheel(s) and a strut assembly that attaches the wheel(s) to the plane. To facilitate turning of the wheel(s), the strut assembly includes a bearing having relatively rotatable portions. When the plane is on the ground, a significant loading of the bearing is normally present due to the portion of the plane's weight carried by the nose gear. During and immediately after take off, the load applied to the bearing due to the wheel's contact with the ground ranges from significant to essentially zero. During a landing, the bearing loading may also vary significantly. To enable precise wheel movements, the bearing must allow smooth rotation without a significant amount of play. The bearing must also be durable and capable of functioning in an environment subject to water, dust and/or other materials often found on the runways of any airport.

Vibration is a problem sometimes associated with structures subject to variable/cyclical loading. In an airplane, the nose gear may experience unwanted vibration during the final stages of a take-off. This occurs as the load due to the wheel's contact with the runway becomes reduced to essentially zero immediately after lift-off. Any unbalance in the nose gear's wheel(s), as well as forces applied by the air stream, may cause vibration in the structural elements of the nose gear that can be transmitted to the airframe and the plane's occupants. A similar intermittent/reduced loading of the nose gear can occur during landings. Any vibration in the nose gear may be transmitted into the associated tire(s), and thereby cause an increased rate of wear while the tire is still in contact with the runway. The vibration may also be transmitted into the plane's steering and suspension systems.

Another problem sometimes associated with structures subject to variable loading is that when the loading becomes reduced to essentially zero, any bearing in the structure may lose positive contact with the surfaces to which it is normally engaged. The lack of positive contact may produce openings into which contaminants may enter. These contaminants can adversely affect the bearing and any adjacent structure.

SUMMARY OF THE INVENTION

The invention is a self-lubricating thrust bearing having a plurality of axially-aligned parts. The bearing is preferably in cartridge form and includes first and second bearing surfaces separated by a disk of lubricating material. In the preferred embodiment, the first bearing surface forms a center portion of a first thrust member that extends outwardly of, and wraps about, the periphery of a second thrust member that includes the second bearing surface.

Unlike the bearings of the prior art, one of the bearing surfaces is incorporated into a multi-part thrust assembly that features a circular spring sandwiched between the second thrust member and a third thrust member. The spring functions to apply a load to the bearing surfaces irrespective of any exterior loading on the bearing. When the external loading is very low, the spring expands the bearing structure in a direction parallel to the bearing's axis, thereby assuring positive contact with, and preferably applying a load to, any structure mated to the first and third thrust members of the bearing. As the bearing becomes loaded by external force(s), the spring becomes compressed to an extent whereby it no longer separates the thrust members of the thrust assembly. Once they contact each other, friction between the thrust assembly's two thrust members is greater than between the first and second bearing surfaces, thereby causing the thrust assembly's thrust members to essentially lock together in a substantially slippage-free engagement. The thrust assembly then acts as a single member and allows the bearing to operate in a conventional manner.

In the preferred embodiment, the spring is in the form of a circular wave washer. The washer is preferably at least partially received within an annular groove in one of the thrust members that sandwich the spring. By selecting a suitable spring rate for the spring, the spring will act to dampen unwanted vibrations created by connected structure, such as an unbalanced wheel of an aircraft's nose gear.

The ability for low load conditions to create vibration in the bearing and/or the structure connected to the bearing is mitigated by the force applied by the bearing's internal spring to the bearing's components, and any attached structure. When the bearing is employed in an airplane's nose gear, the bearing functions to minimize or dampen the vibrations that may occur during takeoffs and landings. In this manner, the life of the plane's nose gear's tire(s) may be increased, as well as possibly reducing vibration in the plane's steering and suspension components.

As an option in the preferred embodiment, one or more o-rings may be employed within the bearing to prevent entry of foreign matter into the unit. As another option, the assembly may include exterior-viewable indicia that facilitates a user's ability to determine the amount of preload acting on the bearing and/or bearing wear.

BRIEF DESCRIPTION OF THE DRAWINGS

FIG. 1 is a front view of a bearing assembly in accordance with the invention.

FIG. 2 is a cross-sectional side view of the bearing assembly shown in FIG. 1, taken at the plane indicated by 2—2.

DETAILED DESCRIPTION OF THE DRAWINGS

Figure 3:
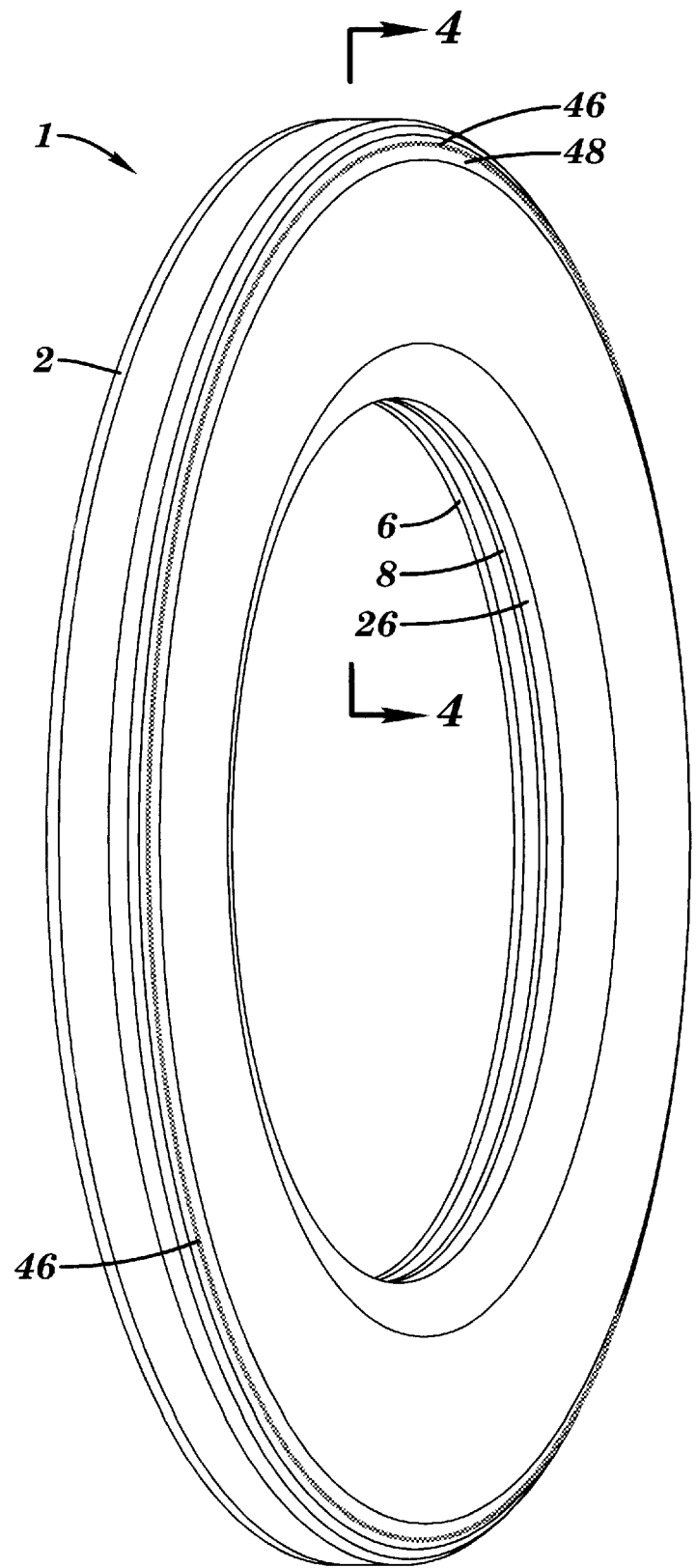
FIG. 3 is a perspective view of the bearing assembly shown in FIG. 1.

Referring now to the drawings in greater detail, wherein like reference numbers refer to like parts throughout the several figures, there is shown by the numeral 1 a bearing assembly in accordance with the invention.

FIGS. 1–6 provide various views of the bearing assembly 1. As can be easily seen in FIG. 2, the bearing assembly is composed of a plurality of separate elements that are concentric about the assembly's center axis (denoted by the dotted centerline shown in the figure). In the preferred embodiment, the combined elements are secured together to form a cartridge that may be easily handled as a single unit.

A substantially disk-shaped first thrust member 2 forms a rear face and the outer sidewall of the assembly 1. The thrust member includes a center portion 4 having a center-located thru-hole defined by edge 6. A compound interior-facing surface 8 (note FIG. 4) of portion 4 forms a first bearing surface located within the assembly. The thrust member 2 includes a peripheral portion 10 that forms the sidewall of the assembly and extends rearwardly away from the member's center portion 4. The peripheral portion 10 includes a tip portion 12 that extends inwardly at an angle toward the bearing assembly's center axis. In the preferred embodiment, the thrust member 2 is made of a metal material, such as steel.

Facing surface 8 of thrust member 2 is another compound bearing surface 14. Surface 14 is complementary in shape to surface 8 and forms a face of a disk-shaped, rigid second thrust member 16. The second thrust member has a center-located thru-hole defined by edge 18 and forms a front portion of a thrust ring assembly 20.

Two circular pads 22 of a lubricating material, preferably a synthetic fluorine-containing resin material such as TEFLON, are preferably bonded to surface 14 and are sandwiched between surfaces 8 and 14. Alternatively, the pads 22 may be bonded to surface 8, or merely positioned so as to be located between said surfaces 8 and 14. The pads prevent direct contact between said surfaces and act as a lubricant to minimize wear and torsional friction when either of said surfaces rotates relative to the other of said surfaces. It should be noted that as another alternative, a lubricating material that is not in pad form, such as grease or oil, may be employed in lieu of the self-lubricating pads 22. While the use of a quantity of lubricating material is preferred, certain conditions or material choices may make the use of a lubricant unnecessary.

Located adjacent the second thrust member 16 is a rigid, disk-shaped third thrust member 24 that forms a back portion of the thrust ring assembly, as well as the front face of the bearing assembly 1. Thrust member 24 features a center-located thru-hole defined by edge 26. An interior-facing surface 28 of thrust member 24 is complementary in shape to a rear surface 30 of the second thrust member 16.

Figure 4:
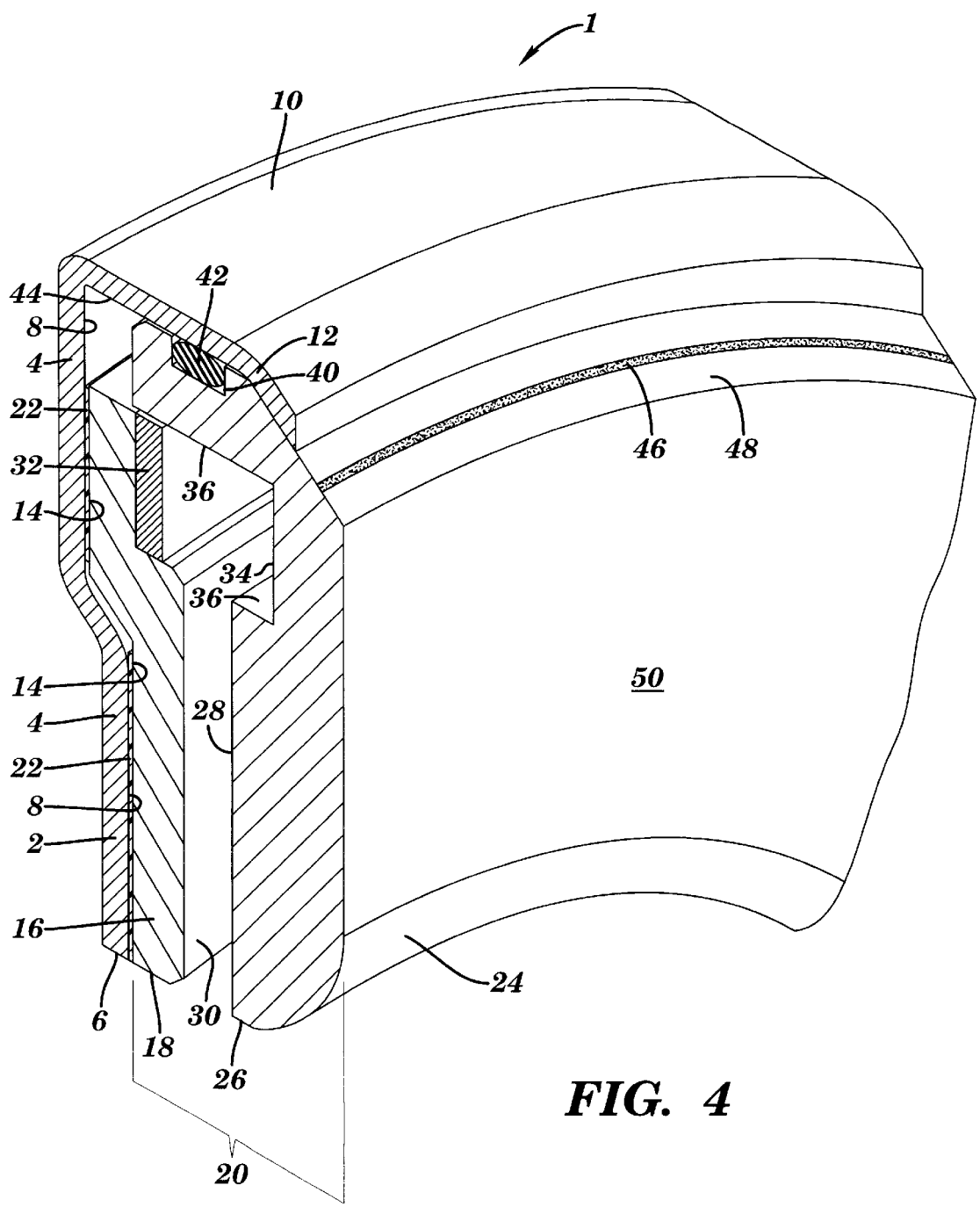
FIG. 4 is a detailed, cross-sectional perspective view of a top, representative portion of the bearing assembly shown in FIG. 3, taken at the plane indicated by 4—4 in FIG. 3.
Figure 5:
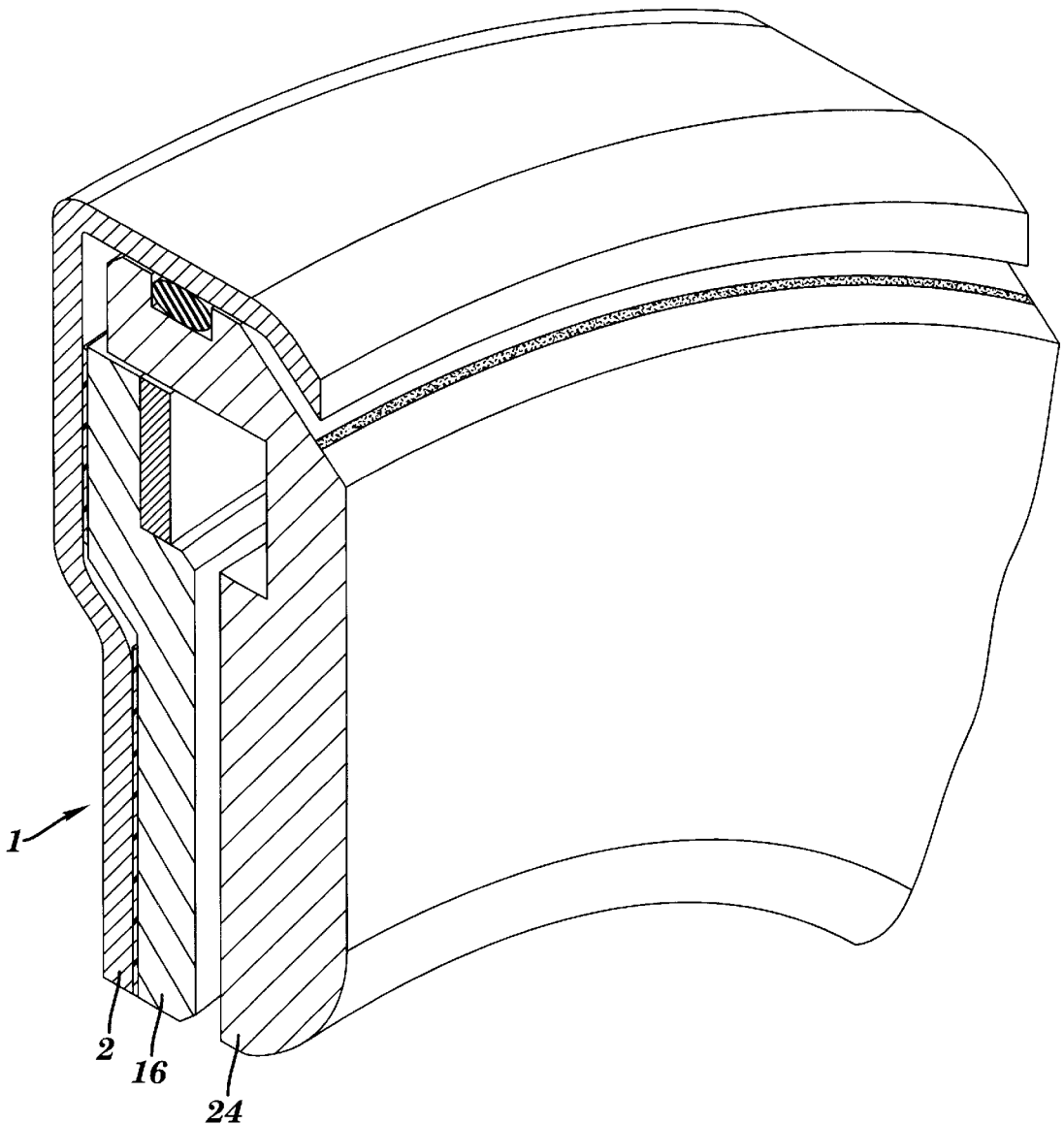
FIG. 5 shows the same bearing assembly portion as shown in FIG. 4, but at a point when the spring is partially compressed.
Figure 6:
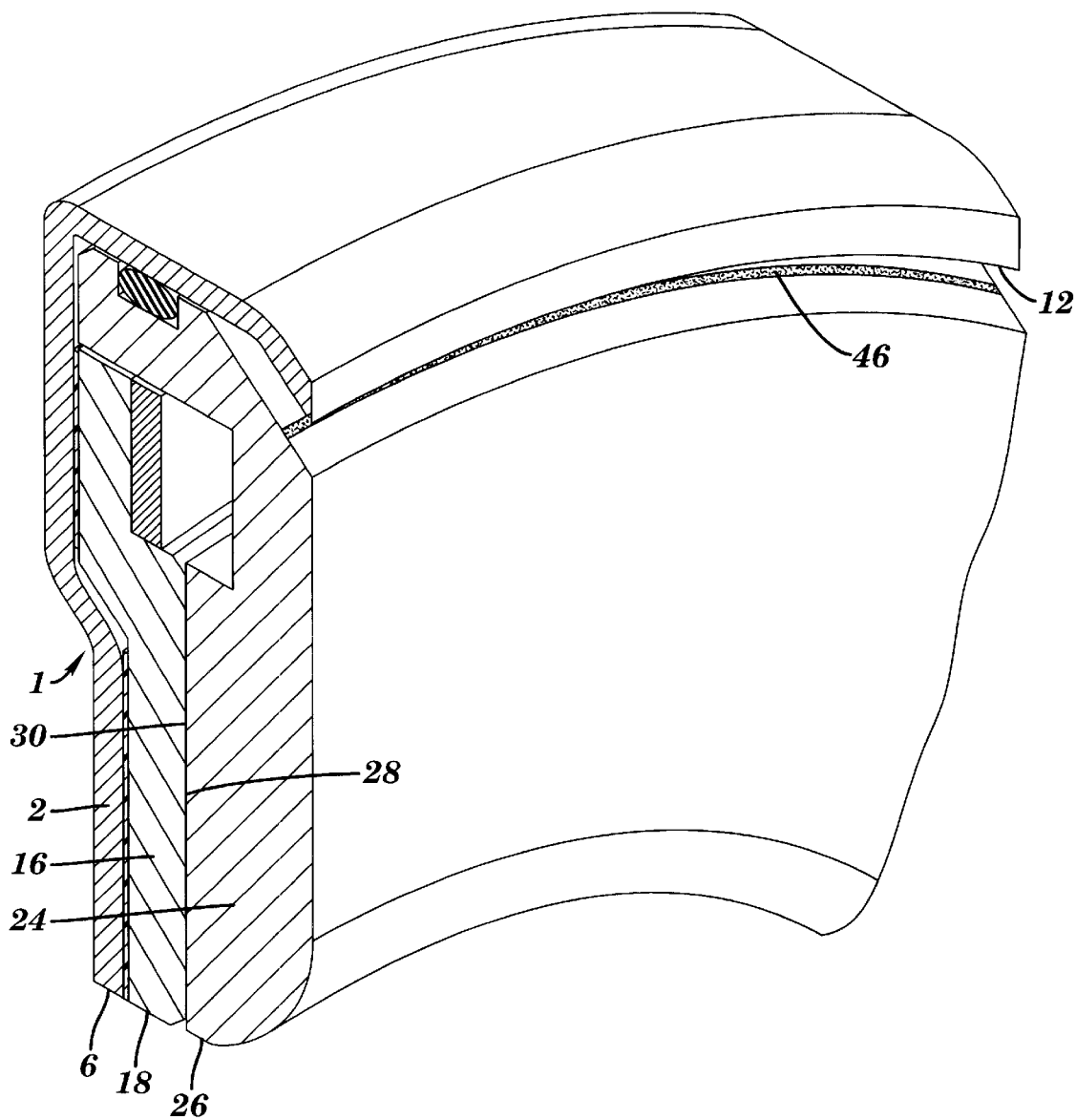
FIG. 6 shows the same bearing assembly portion as shown in FIG. 4, but at a point when the spring is at its maximum compression.

A spring member 32 is sandwiched between thrust members 16 and 24 and functions to spread apart said thrust members when the external loading of the bearing is low. The spring member is located at least partially within an annular groove 34 in surface 28 of the thrust member 24. The groove features sidewalls 36 that preferably extend parallel to each other. FIGS. 4–6 show the spring member in three different stages of compression. One should note that the width of the assembly 1, in a direction parallel to its center axis, changes in inverse proportion with spring compression, from a maximum shown in FIG. 4 to a minimum shown in FIG. 6.

In the preferred embodiment, the spring member 32 is in the form of a conventional gap-type wave spring, also known as a wave washer. The washer preferably features three oscillations or waves that interrupt its planar shape. A fewer or greater number of waves/oscillations may be employed. Alternatively, other types of conventional spring members, including, but not limited to, Belleville washers, coil springs, or resilient materials, may be used in lieu of the shown wave washer. However, a wave washer is preferred due to its simplicity, durability and minimal space envelope. In the preferred embodiment, the spring member 32 is made of a spring steel or other high-strength and/or high-resiliency material or structure. It should also be noted that while one spring member 32 is shown, a spring structure having multiple identical or dissimilar, connected or independent spring members may alternatively be employed to spring bias at least one and preferably both of the second and third thrust members.

As another alternative that is not shown, the spring member may be located between said thrust members 16 and 24 but not reside within a complementary groove. While the spring member is shown sandwiched between thrust members 16 and 24, an embodiment of the invention that is not shown may locate the spring member exterior to the thrust members and be operatively engaged to thrust member 24 in a manner wherein said spring member will cause it to move in response to physical changes in the spring.

Located in a peripheral groove 40 in the third thrust member 24 is an optional seal member 42. The seal member is preferably in the form of an o-ring and is made of a flexible lubricated rubber or synthetic rubber material, such as VITON. Other well known conventional sealing materials, for example natural rubber, nylon, etc. may be employed for the seal member 42. When the bearing assembly 1 is in its assembled form, the seal member 42 becomes sandwiched between the periphery of the third thrust member and an interior facing surface 44 of the first thrust member's peripheral portion 10. The seal member functions to prevent foreign matter from entering into the lubricated interior area of the assembly. It should be noted that by wrapping about and capturing the thrust assembly 20, the first thrust member 2 secures together the entire bearing assembly 1.

It should be noted from FIGS. 4–6 that as the spring member becomes compressed, the inwardly-extending peripheral portion of the third thrust member moves toward, but does not contact, surface 8. At the same time, said portion slides over, but does not contact, the outer perimeter of the second thrust member.

An additional, optional feature that may be incorporated into the bearing assembly 1 is an indication system capable of visibly indicating the amount of preload that is applied to the assembly and/or thickness changes in the pads 22 due to wear. This is accomplished through the placement of indicia 46 onto the outer, beveled surface 48 of the third thrust member 24. The indicia is painted or machined into surface 48, and is preferably conventional in appearance, such as a line or one or more arrows.

The basis for the preload indicating system is that the amount of the beveled surface 48 that extends outwardly of the tip portion 12 of the first thrust member 2 is dependent on the amount that the spring member 32 is compressed. In FIG. 4, the bearing assembly is shown in an unloaded condition. As such, the indicia 46 is spaced from the end of tip portion 12 by a noticeable distance. As an external load is applied to the third thrust member 24, the spring member 32 is compressed and thrust member 24, along with indicia 46, will move inwardly toward thrust member 2. FIG. 5 shows the assembly 1 at a point where the bearing loading has reached a first predetermined amount, such as a desired pre-load. As shown, the indicia 46 is still exposed, but is now located directly adjacent the end of tip portion 12. In this manner, when the bearing assembly 1 is installed in a structure where the indicia is visible, a user merely has to check the position of the indicia 46 to ensure that the bearing has been preloaded properly. It should be noted that other locations or forms of indicia may be substituted for the shown indicia 46. As one example, a pointer arrow can be mounted on the first thrust member 2, and the correct preload will be indicated when the plane of the exterior flat surface 50 of the third thrust member 24 becomes even with the end of the arrow.

The basis for a system to indicate pad wear also depends on the amount of the beveled surface 48 that extends outwardly of the first thrust member's tip portion 12. As noted previously, FIG. 6 shows the bearing in a fully compressed state. As an alternative, the indicia 46 may instead be located on surface 48 whereby, when the pads are new and the bearing is fully compressed, the indicia will be completely exposed, but proximate tip portion 12. As pads 22 wear down, a decreasing amount of surface 48 will be visible when the bearing is fully compressed. As a result, the visible portion of indicia 48 will indicate pad wear as it becomes reduced, and eventually covered by the end of tip portion 12. In this manner, an operator will be able to view the exterior of the bearing and thereby determine whether the pads have worn to the point where they, or the bearing, should be replaced.

Figure 7:
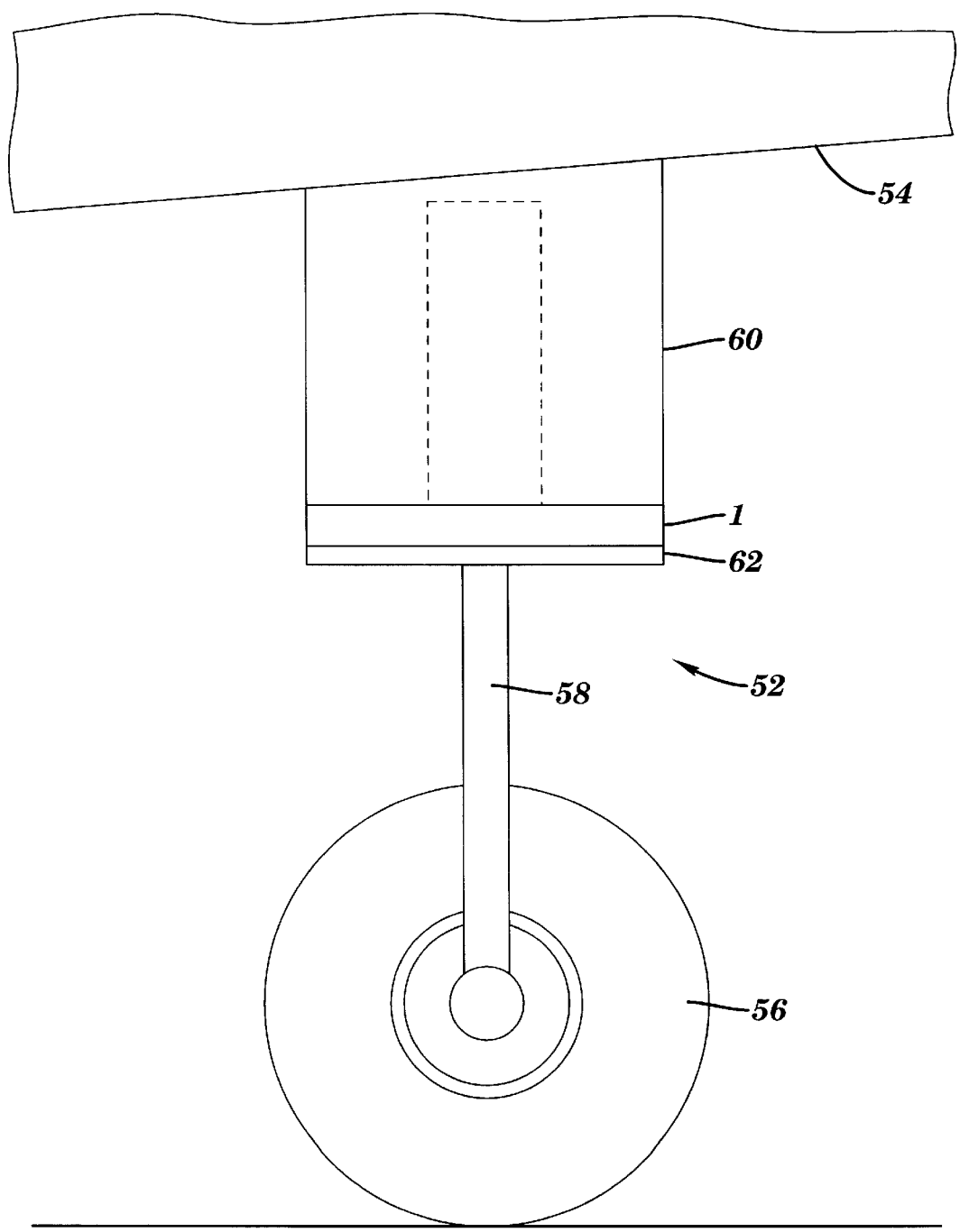
FIG. 7 is a generalized view of an airplane's nose gear that includes the bearing assembly shown in FIG. 1.

FIG. 7 provides a side view of one application for the bearing assembly 1. Shown in the figure is a generalized representation of a nose gear 52 extending downwardly from the underside 54 of a typical airplane, such as a jet airliner or a small propeller-driven airplane. The nose gear includes a rotatable wheel 56 that is secured to a lower support member/strut 58. The lower support member is rotatable within an upper support member/strut 60 to enable steering of the wheel 56 when the airplane is moving on the ground. As shown, the bearing assembly 1 is located between said upper and lower support members. In this example, the assembly 1 is oriented so that the third thrust member 24 contacts a flange portion 62 of the lower support member 58, and the first thrust member 2 contacts a bottom portion of the upper support member 60.

The operation of the bearing will be described in relation to the example of usage provided in FIG. 5. It should be noted that the bearing assembly can be used in other applications, including land vehicle steering systems, heavy machinery, etc.

When a plane initially taxis down a runway, the nose gear 52 is supporting a significant portion of the airplane's weight. During this period, the bearing assembly's spring member 32 is in the condition depicted in FIG. 6 whereby the spring member is compressed to the point where surface 28 of thrust member 24 fully contacts surface 30 of the second thrust member 16. In so doing, friction between surfaces 28 and 30 is much greater than between the lubricated bearing surfaces 8 and 14, thereby essentially locking together the second and third thrust members.

As the plane picks up speed, the wings produce lift and the pilot, at the proper time, pulls back on the yoke and causes the plane's nose to lift. It is from this point, when the wheel(s) of the nose gear are still spinning but are carrying little or none of the plane's weight, that vibration in the nose gear can occur. However, it is also at this point that the spring member 32 overcomes the compressive force exerted by the now reduced amount of the plane's weight on the nose gear. The spring member expands and forces apart the second and third thrust members, possibly to the extent shown in FIGS. 4 and 5. This maintains the bearing's contact with adjacent structure, and at least partially loads the bearing and preferably also said adjacent structure. This mitigates or eliminates the creation of vibration in the nose gear.

It should be noted that while the first, second and third thrust members are all shown as round plates having a thru-hole, any or all of said members may be in a different shape, have a different thru-hole diameter, or may not include a thru-hole. Furthermore, while a frictional engagement is taught between the second and third thrust members when the spring member 32 is at the maximum compression shown in FIG. 6, other forms of engagement may be employed. Additionally, when the bearing 1 is in an unloaded condition, member 26 will preferably not rotate relative to member 16. However, in the embodiment shown, such relative rotation is not physically prevented and is therefore allowable. Alternatively, the bearing may include conventional structure to prevent such rotation, or may include lubrication in the area of the spring to facilitate such rotation.

The preferred embodiment of the invention disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. A bearing assembly comprising:

a first member having a bearing surface and capable of being connected to an external structure;

a second member having a bearing surface, wherein the bearing surface of said second member faces and is located substantially adjacent to the bearing surface of said first member, and wherein at least one of said first and second members is rotatable relative to the other of said members;

a third member located whereby said second member is between said first and third members, and wherein said third member is capable of being connected to an external structure; and a spring structure that acts to continually urge said first and second members together while also being operatively connected to said third member whereby when said spring structure is in a first condition of compression, it causes said third member to be spaced from said second member by a first distance, and wherein when said spring structure is in a predetermined second condition of compression that is greater than said first condition of compression, said first distance is reduced and said spring structure and said second and third members become non-rotatably engaged to each other.

2. A bearing assembly comprising:
- a first thrust member, wherein said member has a bearing surface and is capable of being connected to an external structure;
- a second thrust member, wherein said second thrust member has a bearing surface that faces the bearing surface of said first thrust member, and wherein at least one of said first and second thrust members is rotatable relative to the other of said members;
- a third thrust member, wherein said third thrust member is capable of being connected to an external structure and is located whereby said second thrust member is situated between said first and third thrust members; and
- a spring structure operatively connected to said second and third thrust members, wherein when said spring structure is in a first condition of compression, it causes said third thrust member to be spaced from said second thrust member by a first distance, and wherein when said spring structure is in a predetermined second state of compression that is greater than said first state of compression, the distance between the second and third thrust members will be less than said first distance and the third thrust member will engage the second thrust member whereby said third thrust member will not rotate relative to said second thrust member.

3. The bearing assembly of claim 2 wherein when said third thrust member is engaged to said second thrust member, it physically contacts said second thrust member.

4. The bearing assembly of claim 2 further comprising a lubricating material, wherein said material is located whereby it can facilitate relative rotation between said first and second thrust members.

5. The bearing assembly of claim 2 further comprising indicia located on said third thrust member in a manner whereby said indicia visually indicates an amount of compression of the spring structure.

6. The bearing assembly of claim 5 wherein said indicia is in the form of a line located on a portion of the third thrust member that is visible when said spring structure is in said first state of compression, wherein when said spring structure is in a predetermined state of compression that is greater than said first state of compression, said line will have moved closer to said first thrust member.

7. A bearing assembly comprising:
- a first thrust member, wherein said member has a bearing surface and is capable of being connected to an external structure;
- a second thrust member, wherein said second thrust member has a bearing surface that faces the bearing surface of said first thrust member, and wherein at least one of said first and second thrust members is rotatable relative to the other of said members;
- a third thrust member, wherein said third thrust member is capable of being connected to an external structure and is located whereby said second thrust member is situated between said first and third thrust members; and
- a wave washer operatively connected to, and sandwiched between, said second and third thrust members, wherein said wave washer continually urges said second thrust member toward said first thrust member, wherein when said wave washer is in a first condition of compression, it causes said third thrust member to be spaced from said second thrust member by a first distance, and wherein when said wave washer is in a predetermined second state of compression that is greater than said first state of compression, the distance between the second and third thrust members will be less than said first distance and the third thrust member will engage the second thrust member in a substantially non-rotatable manner.

8. A bearing assembly comprising:
- a first thrust member, wherein said member has a bearing surface and is capable of being connected to an external structure;
- a second thrust member, wherein said second thrust member has a bearing surface that faces the bearing surface of said first thrust member, and wherein at least one of said first and second thrust members is rotatable relative to the other of said members;
- a third thrust member, wherein said third thrust member is capable of being connected to an external structure and is located whereby said second thrust member is situated between said first and third thrust members;
- wherein said first thrust member includes a peripheral portion that at least partially encircles said second and third thrust members and functions to secure together all of said thrust members; and
- a spring structure operatively connected to said second and third thrust members, wherein when said spring structure is in a first condition of compression, it causes said third thrust member to be spaced from said second thrust member by a first distance, and wherein when said spring structure is in a predetermined second state of compression that is greater than said first state of compression, the distance between the second and third thrust members will be less than said first distance and the third thrust member will engage the second thrust member in a substantially non-rotatable manner.

9. The bearing assembly of claim 8 further comprising a seal member located between said peripheral portion of said first thrust member and a peripheral portion of the third thrust member.

10. The bearing assembly of claim 9 wherein the third thrust member includes a peripheral groove into which the seal member is at least partially received.

11. The bearing assembly of claim 10 wherein the seal member is in the form of an o-ring.

12. A bearing assembly comprising:
- a first thrust member, wherein said member has a bearing surface and is capable of being connected to an external structure;
- a thrust assembly located adjacent said first thrust member, wherein said thrust assembly includes a second thrust member having a bearing surface that faces the bearing surface of said first thrust member, wherein relative movement in a first direction about a predetermined axis of rotation is allowed between said first and second thrust members, and wherein said axis of rotation extends through an area at least partially surrounded by said first bearing surface;
- a lubricating material at least partially located between the bearing surfaces of said first and second thrust members;
- wherein said thrust assembly also comprises a third thrust member and a spring member, wherein said spring member surrounds said axis of rotation and is operatively connected to said second and third thrust members, whereby said spring member continually urges said second thrust member toward said first thrust member, wherein when said spring member is in a first state of compression, it causes said third thrust member to be spaced from said second thrust member by a first distance, and wherein when said spring member is in a predetermined second state of compression that is greater than said first state of compression, the third thrust member will become operatively engaged to said second thrust member; and wherein if the first thrust member is allowed to rotate in said first direction relative to the second thrust member, said first thrust member will rotate about said axis of rotation, and wherein if the second and third thrust members are operatively engaged and are allowed to rotate in said first direction relative to said first thrust member, both of said second and third thrust members will rotate about said axis of rotation.

13. The bearing assembly of claim 12 wherein the lubricating material is in the form of a pad of synthetic, fluorine-containing resin material.

14. The bearing assembly of claim 12 wherein the spring member is in the form of a wave washer.

15. The bearing assembly of claim 12 wherein the spring member is at least partially sandwiched between said second and third thrust members.

16. The bearing assembly of claim 15 wherein the spring member is received within an annular groove in one of said thrust members of said thrust assembly.

17. The bearing assembly of claim 12 wherein said first thrust member includes a peripheral portion that at least partially wraps about said thrust assembly and functions to secure said thrust assembly to said thrust member.

18. The bearing assembly of claim 17 further comprising a seal member located between said peripheral portion of said first thrust member and a portion of said thrust assembly.

19. The bearing assembly of claim 12 wherein when said spring member is compressed from said first state of compression to said second state of compression, a distance measurement between said first and third thrust members will decrease.

20. A bearing assembly comprising:

a first thrust member, wherein said member has a bearing surface and is capable of being connected to an external structure;

a thrust assembly located adjacent said first thrust member, wherein said thrust assembly includes a second thrust member having a bearing surface that faces the bearing surface of said first thrust member, wherein relative movement in a first direction about a predetermined axis of rotation is allowed between said first and second thrust members, and wherein said axis of rotation extends through an area at least partially surrounded by said first bearing surface;

a lubricating material at least partially located between the bearing surfaces of said first and second thrust members;

wherein said thrust assembly also comprises a third thrust member and a spring member, wherein said spring member surrounds said axis of rotation and is operatively connected to said second and third thrust members, whereby said spring member continually urges said second thrust member toward said first thrust member, wherein when said spring member is in a first state of compression, it causes said third thrust member to be spaced from said second thrust member by a first distance, and wherein when said spring member is in a predetermined second state of compression that is greater than said first state of compression, the third thrust member will become operatively engaged to said second thrust member;

wherein when the second and third thrust members are operatively engaged, an exterior portion of said third thrust member includes indicia located in a manner whereby said indicia can indicate to a viewer that said lubricating material has at least a predetermined minimum thickness; and wherein if the first thrust member is allowed to rotate in said first direction relative to the second thrust member, said first thrust member will rotate about said axis of rotation, and wherein if the second and third thrust members are operatively engaged and are allowed to rotate in said first direction relative to said first thrust member, both of said second and third thrust members will rotate about said axis of rotation.

21. A bearing assembly comprising:

a first thrust member, wherein said member has a bearing surface and is capable of being connected to an external structure;

a thrust assembly located adjacent said first thrust member, wherein said thrust assembly includes a second thrust member having a bearing surface that faces the bearing surface of said first thrust member, wherein relative movement in a first direction about a predetermined axis of rotation is allowed between said first and second thrust members, and wherein said axis of rotation extends through an area at least partially surrounded by said first bearing surface;

a lubricating material at least partially located between the bearing surfaces of said first and second thrust members;

wherein said thrust assembly also comprises a third thrust member and a spring member, wherein said spring member surrounds said axis of rotation and is operatively connected to said second and third thrust members, whereby said spring member continually urges said second thrust member toward said first thrust member, wherein when said spring member is in a first state of compression, it causes said third thrust member to be spaced from said second thrust member by a first distance, and wherein when said spring member is in a predetermined second state of compression that is greater than said first state of compression, the third thrust member will become operatively engaged to said second thrust member;

further comprising indicia located on a portion of the third thrust member that is viewable from an area exterior to said bearing assembly when said spring member is in said first state of compression, and wherein when said spring member is in said first state of compression and is then compressed, at least a portion of said indicia will move toward a portion of the first thrust member; and wherein if the first thrust member is allowed to rotate in said first direction relative to the second thrust member, said first thrust member will rotate about said axis of rotation, and wherein if the second and third thrust members are operatively engaged and are allowed to rotate in said first direction relative to said first thrust member, both of said second and third thrust members will rotate about said axis of rotation.

22. A bearing assembly comprising:

a first thrust member, wherein said member has a bearing surface and is capable of being connected to an external structure;

a thrust assembly located adjacent said first thrust member, wherein said thrust assembly includes a second thrust member having a bearing surface that faces the bearing surface of said first thrust member, wherein relative movement is allowed between said first and second thrust members;

a lubricating material at least partially located between the bearing surfaces of said first and second thrust members;

wherein said thrust assembly also comprises a third thrust member and a spring member, wherein said spring member is operatively connected to said second and third thrust members, whereby said spring member continually urges said second thrust member toward said first thrust member, wherein when said spring member is in a first state of compression, it causes said third thrust member to be spaced from said second thrust member by a first distance, and wherein when said spring member is in a predetermined second state of compression that is greater than said first state of compression, the third thrust member will become operatively engaged to said second thrust member; and wherein the spring member is in the form of a wave washer.

23. A bearing assembly comprising:

a first thrust member, wherein said member has a bearing surface and is capable of being connected to an external structure;

a thrust assembly located adjacent said first thrust member, wherein said thrust assembly includes a second thrust member having a bearing surface that faces the bearing surface of said first thrust member, wherein relative movement is allowed between said first and second thrust members;

a lubricating material at least partially located between the bearing surfaces of said first and second thrust members;

wherein said thrust assembly also comprises a third thrust member and a spring member, wherein said spring member is operatively connected to said second and third thrust members, whereby said spring member continually urges said second thrust member toward said first thrust member, wherein when said spring member is in a first state of compression, it causes said third thrust member to be spaced from said second thrust member by a first distance, and wherein when said spring member is in a predetermined second state of compression that is greater than said first state of compression, the third thrust member will become operatively engaged to said second thrust member; and wherein the spring member is received within an annular groove in one of said thrust members of said thrust assembly.

24. A bearing assembly comprising:

a first thrust member, wherein said member has a bearing surface and is capable of being connected to an external structure;

a thrust assembly located adjacent said first thrust member, wherein said thrust assembly includes a second thrust member having a bearing surface that faces the bearing surface of said first thrust member, wherein relative movement is allowed between said first and second thrust members;

a lubricating material at least partially located between the bearing surfaces of said first and second thrust members;

wherein said thrust assembly also comprises a third thrust member and a spring member, wherein said spring member is operatively connected to said second and third thrust members, whereby said spring member continually urges said second thrust member toward said first thrust member, wherein when said spring member is in a first state of compression, it causes said third thrust member to be spaced from said second thrust member by a first distance, and wherein when said spring member is in a predetermined second state of compression that is greater than said first state of compression, the third thrust member will become operatively engaged to said second thrust member; and wherein said first thrust member includes a peripheral portion that at least partially wraps about said thrust assembly and functions to secure said thrust assembly to said thrust member.

* * * * *